US005485797A

United States Patent [19]
Green et al.

[11] Patent Number: 5,485,797
[45] Date of Patent: Jan. 23, 1996

[54] TRAILING CART FOR AGRICULTURAL TOOLBAR

[75] Inventors: Lawrence D. Green, Bettendorf, Iowa; Ronald L. Pratt, Taylor Ridge, Ill.

[73] Assignee: Deere & Company, Moline, Ill.

[21] Appl. No.: 236,711

[22] Filed: Apr. 29, 1994

[51] Int. Cl.$^6$ .............................. A01C 1/00; A01C 7/00
[52] U.S. Cl. .................... 111/200; 111/925; 280/414.5
[58] Field of Search .................................. 111/118, 135, 111/136, 139, 187, 196, 200, 925; 172/311, 325, 326, 327, 328, 413, 446, 456, 776; 280/401 R, 413, 414.5, 474

[56] References Cited

U.S. PATENT DOCUMENTS

| | | |
|---|---|---|
| 2,139,212 | 5/1938 | Tonjes, Jr. . |
| 3,900,201 | 8/1975 | Johnson et al. . |
| 4,428,435 | 1/1984 | Hubbard et al. ................. 172/328 |
| 4,504,076 | 3/1985 | Bedney ............................. 172/311 |
| 4,558,882 | 12/1985 | Fuss et al. . |
| 4,562,779 | 1/1986 | Briggs . |
| 4,579,361 | 4/1986 | Lowe et al. . |
| 4,586,724 | 5/1986 | Sargent et al. ................... 172/311 X |
| 4,681,335 | 7/1987 | Ledermann et al. . |
| 4,723,787 | 2/1988 | Hadley et al. . |
| 4,811,795 | 3/1989 | Dean et al. . |
| 4,896,730 | 1/1990 | Jarrett et al. ..................... 172/311 X |
| 5,025,616 | 6/1991 | Moss ................................ 172/311 X |
| 5,161,473 | 11/1992 | Landphair et al. . |

FOREIGN PATENT DOCUMENTS

| | | |
|---|---|---|
| 1104427 | 7/1981 | Canada . |
| 326743 | 10/1920 | Germany . |
| 824566 | 12/1959 | United Kingdom . |

Primary Examiner—Randolph A. Reese
Assistant Examiner—Robert Pezzuto

[57] ABSTRACT

The invention is directed to an integral coupling arrangement for coupling a trailing cart to a transverse toolbar. The cart is provided with two draft links extending forwardly from the cart that are pivotally coupled to the toolbar. A central hitch also extends forwardly from the cart and is coupled to the toolbar by a floating link. Pushing and pulling forces are applied through the draft links only. The central hitch carries the vertical weight applied by the cart.

17 Claims, 3 Drawing Sheets

TRAILING CART FOR AGRICULTURAL TOOLBAR

BACKGROUND OF THE INVENTION

1. Field of the Invention

The present invention is directed to a trailing cart that is coupled to a transverse toolbar by two draft links and hitch located between the draft links. The hitch is provided with a floating link for coupling the hitch to the toolbar.

2. Description of the Prior Art

Large air seeders are towed implements. They usually comprise a cultivator and a seed cart. The seed cart may be coupled behind the cultivator. The cultivator is towed by a tractor which in turn tows the seed cart. The seed cart has a pneumatic system for directing seed from the seed cart to each of the cultivators. The seed cart may also be provided with a fertilizer and/or pesticide compartment for simultaneously applying these chemicals during a seeding operation.

A variety of designs have been used to couple a trailing cart to the transverse toolbar frame of the cultivator. One design, uses two draft links coupled between the frame of the cart and the toolbar frame wherein the seed cart rides on a single caster wheel. Two caster wheels tied together with a walking beam arrangement may also be used. Although a cart using this towing arrangement can be towed behind a rigid frame toolbar frame, it cannot be towed behind a flexible center toolbar frame, unless the two draft links are on the same side of the center pivot. In another design, the cart is provided with a single towing hitch and two rigid wheels.

Carts with two caster wheels and a single towing hitch are used in tow between arrangements, wherein the cart is located between the tractor and the toolbar frame. Carts using this towing configuration are difficult to back up and turn tightly.

Some trailing carts that are coupled to a rigid toolbar frame may use two caster wheels and two draft arms. However the draft links or frame members must be torqued up or both tires will not always be touching the ground when the cart is towed over uneven terrain.

SUMMARY

It is an object of the present invention to provide an assembly for integrally coupling a trailing cart to a flexible or rigid toolbar.

It is a feature of the present invention that the assembly is provided with two draft links connecting the cart frame to the toolbar, and a central hitch having a floating link.

The trailing cart of the present invention comprises a frame having two caster wheels supporting a material carrying hopper. Two draft links extend forwardly from the frame together with a central hitch having a floating link. The draft links are coupled to the toolbar by ball joints and are pivotally coupled to the cart frame. The floating link comprises an inverted Y-shaped link having an upwardly extending stem and two downwardly extending branches. The stem is provided with a ball joint for coupling the link to the central hitch. The two branches are provided with a pin for pivotally attaching the link to the toolbar.

The trailing cart is integrally mounted to the toolbar by the mounting assembly. More specifically, the cart frame remains substantially parallel to the toolbar during operations. Only the draft links pull the cart. The central hitch and floating link carry the vertical hitch weight. In addition the central hitch takes side loads, preventing the cart from moving sideways with respect to the toolbar. The floating link allows the central hitch to move forward and backward. For example in uneven terrain the left toolbar segment may rise in response to a hill while the right toolbar segment remains level. In this situation the left hand side of the cart is pulled forwardly a small bit as the horizontal length of the left draft link has been essentially shortened. As the central hitch is free to move forward and backward the mounting assembly does not bind in this situation.

DETAILED DESCRIPTION

Figure 1:
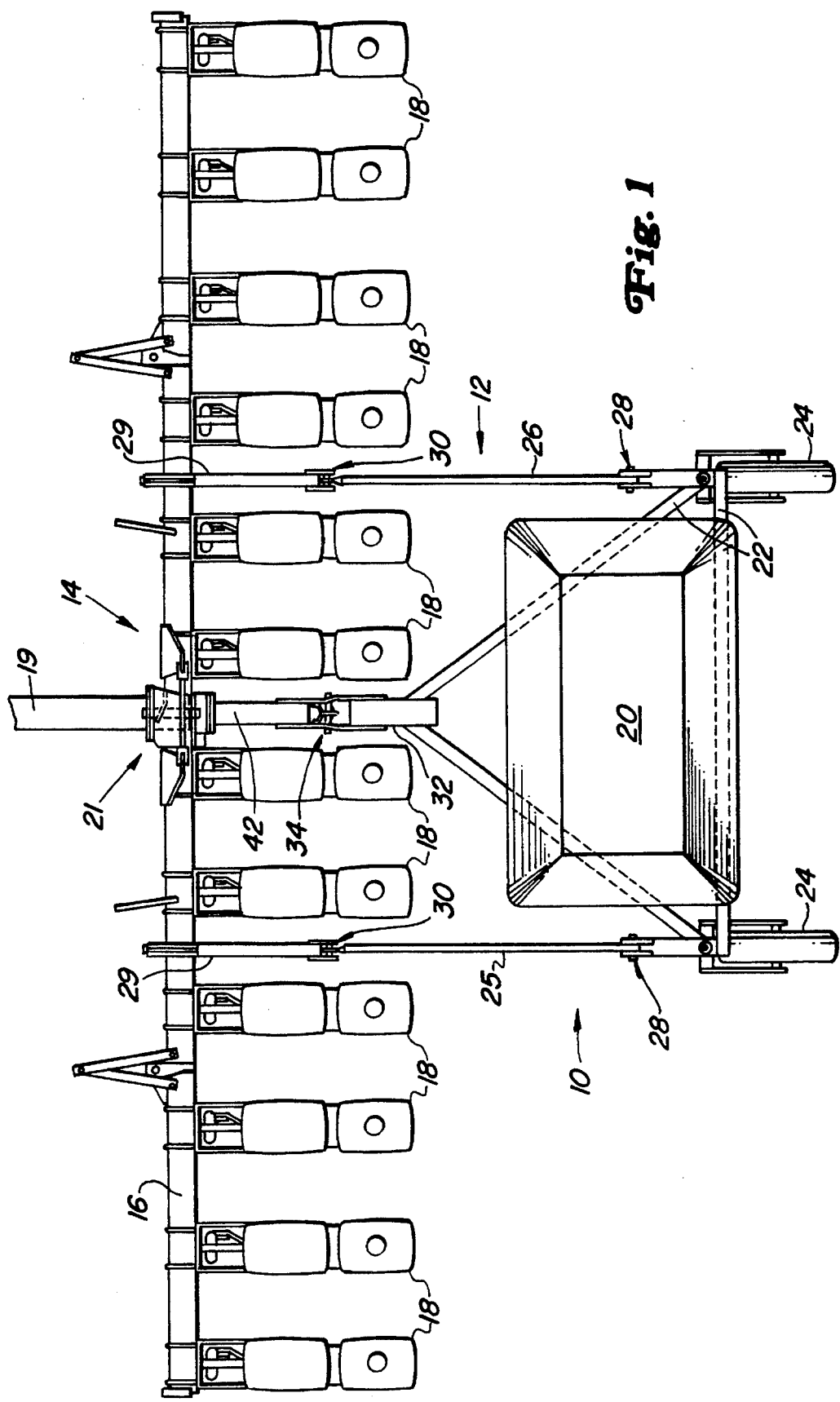
FIG. 1 is a top view of a row crop planter having a trailing cart of the present invention.

The present invention comprises a trailing cart 10 that is attached by mounting assembly 12 to row crop planter 14. The row crop planter is provided with a transverse toolbar 16 on which are mounted a series of row crop units 18. The toolbar is towed by a tractor through fore/aft hitch 19. The toolbar is a flexible toolbar being flexible about a fore/aft central pivot 21. In addition the toolbar is also a front folding toolbar. The present invention is illustrated as being used on a row crop planter having a flexible toolbar, to which it is particularly well suited, however it could also be used with other agricultural implements, such as air seeders, grain drills and other application equipment, or be mounted to a rigid toolbar.

In the illustrated embodiment the trailing cart would be provided with a seed on demand delivery system as illustrated in U.S. Pat. No. 5,161,473, incorporated herein by reference. The seed on demand delivery system would direct from the hopper 20 of the trailing cart to the individual seed hoppers of the row units. Such a system could also direct seeds from the cart to chisel plows for an air seeder, and to the seed meters of a grain drill. The trailing cart could also be used to carry fertilizer or pesticides.

The trailing cart 10 comprises a cart frame 22 having two caster wheels 24 that support the frame above the ground. The hopper 20 is mounted to the frame. Extending forward from the frame are first and second draft links 25 and 26, respectively. The first and second draft links 25 and 26 are provided with pivots 28 at their frame ends for pivotally mounting the draft links to the cart frame 22. In addition, the first and second draft links 25 and 26 are provided with ball joints 30 at their toolbar ends for pivotally coupling the draft links to toolbar extensions 29.

Figure 3:
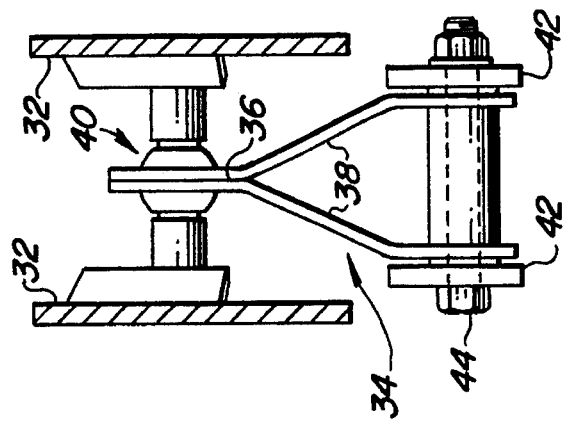
FIG. 3 is a cross sectional view of the floating link taken along line 3—3 in FIG. 2.
Figure 2:
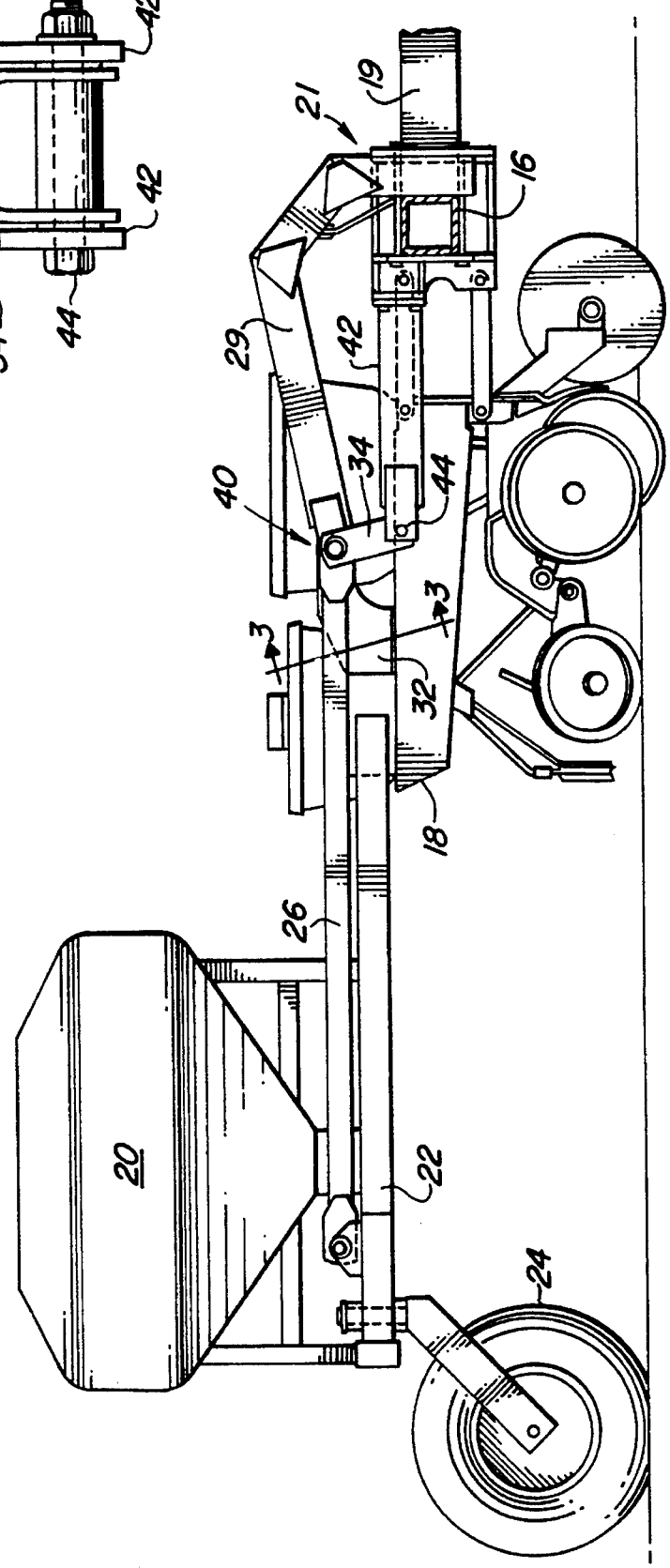
FIG. 2 is a side view of the trailing cart and planter.
Figure 4:
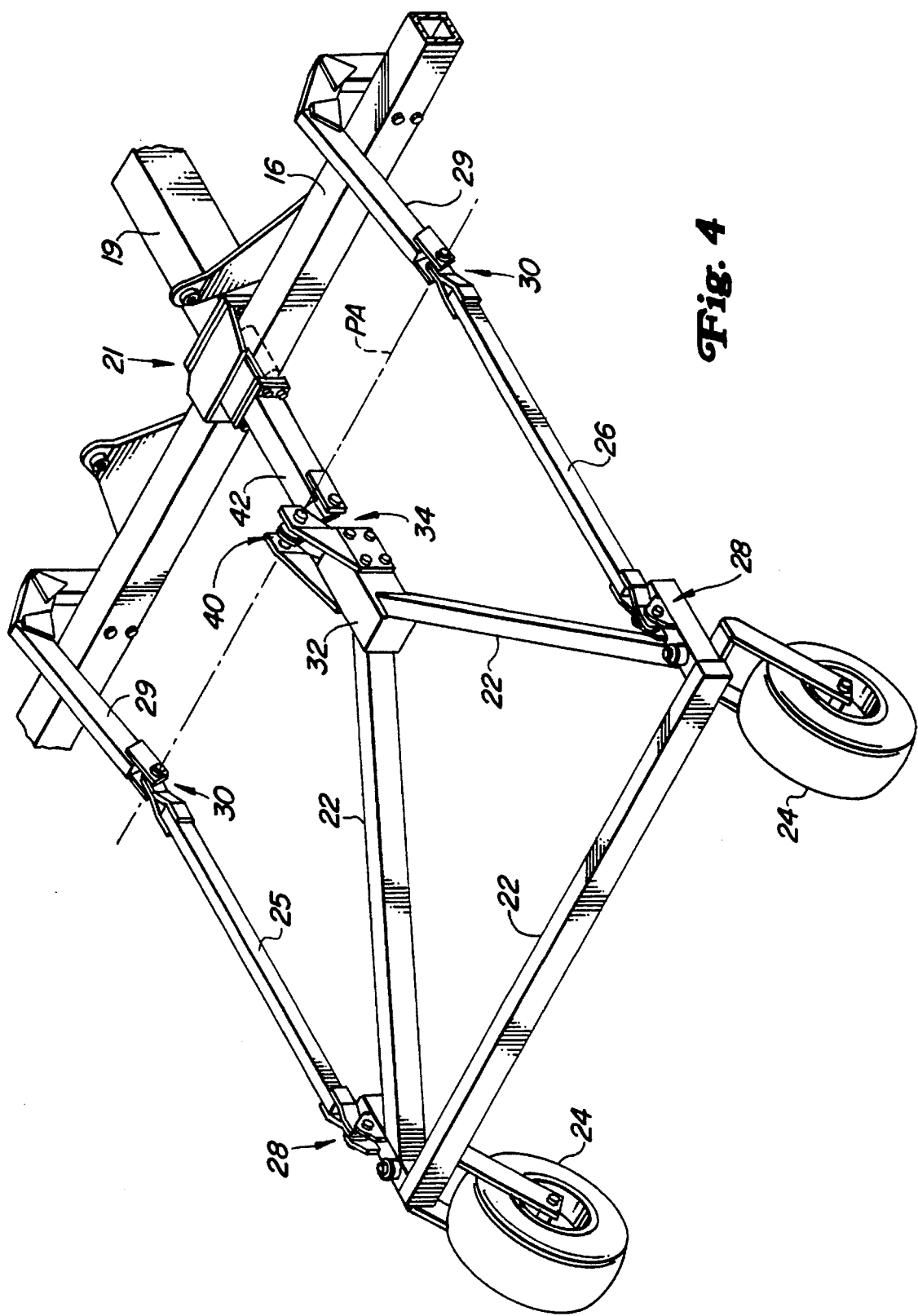
FIG. 4 is a perspective view of the trailing cart frame, draft links and hitch.

Extending forward from the frame between the two draft links 25 and 26 is a central hitch 32 having a floating link assembly 34. The floating link assembly comprises an inverted Y-shaped link, best illustrated in FIG. 3, having upwardly extending stem 36 and two downwardly extending branches 38. The hitch 32 is pivotally mounted to the stem of the floating link 34 by ball joint 40. The branches of the floating link 34 are pivotally coupled to toolbar extension 42 by pivot pin 44.

As the fore/aft relationship of the central hitch 32 to the toolbar extension 42 is dictated by the first and second draft links 25 and 26, the floating link 34 cannot transmit pulling or pushing forces to the trailing cart 10 because of its vertical orientation. Pushing and pulling forces are transmitted by the draft links 25 and 26, only. The central hitch 32 transfers vertical forces, in the form of weight, to the toolbar extension 42 through the floating link 34. In addition, the central hitch also takes in sideloads, thereby preventing the cart from moving sideways with respect to the toolbar.

It is desirable that all three ball joints, the two draft links ball joints 30 and the central hitch ball joint 40, be arranged along a transverse pivot axis PA that is parallel to the toolbar and perpendicular to the direction of travel. In this arrangement the trailing cart can follow the toolbar in uneven or undulating terrain while remaining integrally attached to the toolbar so that its wheels follow in the tracks of the toolbar or tractor wheels.

The present invention should not be limited by the above-described embodiment, but should be limited solely by the claims that follow.

We claim:

1. A trailing cart for being towed by a transverse toolbar, the cart comprising:
   a frame having a pair of caster wheels for supporting the frame as it is moved over a field;
   a material carrying hopper being supported on the frame;
   first and second draft links pivotally coupled to the frame and extending forwardly from the frame for engagement with said transverse toolbar;
   a central hitch located between the first and second draft links and extending forwardly from the frame for engagement with said transverse toolbar; and
   a floating link mounted to the central hitch for coupling the central hitch to said transverse toolbar, the floating link permits the central hitch to move forward and backward relative to said transverse toolbar to which it is attached as the trailing cart moves over uneven terrain.

2. A trailing cart as defined by claim 1 wherein the first and second draft links are provided with toolbar ends having ball joints for coupling the draft links to said transverse toolbar.

3. A trailing cart as defined by claim 2 wherein the first and second draft links are provided with frame ends having pivots for pivotally coupling the draft links to the frame.

4. A trailing cart as defined by claim 2 wherein the floating link is provided with a ball joint to allow the cart to flex side-to-side relative to said transverse toolbar to which it is attached.

5. A trailing cart as defined by claim 4 wherein the floating link comprises an inverted Y-shaped link having an upwardly extending stem and two downwardly extending branches.

6. A trailing cart as defined by claim 5 wherein the upwardly extending stem is provided with a ball joint that is coupled to the central hitch.

7. A trailing cart as defined by claim 6 wherein the two branches are provided with at least one pivot pin for coupling the floating link to said transverse toolbar.

8. A trailing cart as defined by claim 7 wherein the central hitch ball joint and the first and second draft links ball joints are arranged along a transverse pivot axis.

9. An agricultural implement comprising:
   a transverse toolbar carrying tools for performing an agricultural operation;
   a trailing cart being towed by the transverse toolbar, the trailing cart having a material carrying hopper supported on a frame with a pair of caster wheels for supporting the frame;
   an integral coupling arrangement for coupling the trailing cart to the transverse toolbar.

10. An agricultural implement as defined by claim 9 wherein the coupling arrangement comprises first and second draft links pivotally coupled to the frame by pivots and extending forwardly from the frame to the transverse toolbar where the first and second draft links are pivotally coupled to the transverse toolbar by ball joints.

11. An agricultural implement as defined by claim 10 wherein the coupling arrangement further comprises a central hitch located between the first and second draft links and extending forwardly from the frame for engagement with the transverse toolbar.

12. An agricultural implement as defined by claim 11 wherein the central hitch is provided with a floating link which mounts the hitch to the transverse toolbar, the floating link permits the hitch to move forward and backward relative to the transverse toolbar.

13. An agricultural implement as defined by claim 12 wherein the floating link is provided with a ball joint to allow the cart to flex side-to-side relative to the transverse toolbar to which it is attached.

14. An agricultural implement as defined by claim 13 wherein the floating link comprises an inverted Y-shaped link having an upwardly extending stem and two downwardly extending branches.

15. An agricultural implement as defined by claim 14 wherein the upwardly extending stem is provided with a ball joint that is coupled to the central hitch.

16. An agricultural implement as defined by claim 15 wherein the two branches are provided with at least one pivot pin for coupling the floating link to the transverse toolbar.

17. An agricultural implement as defined by claim 16 wherein the central hitch ball joint and the first and second draft links ball joints are arranged along a transverse pivot axis.

* * * * *